(12) United States Patent
Zeira

(10) Patent No.: US 9,451,555 B2
(45) Date of Patent: Sep. 20, 2016

(54) METHOD FOR CONTROLLING TRANSMIT POWER OF A MOBILE STATION

(71) Applicant: INTERDIGITAL PATENT HOLDINGS, INC., Wilmington, DE (US)

(72) Inventor: Eldad M. Zeira, Huntington, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 14/730,330

(22) Filed: Jun. 4, 2015

(65) Prior Publication Data

US 2016/0044602 A1    Feb. 11, 2016

Related U.S. Application Data

(63) Continuation of application No. 13/494,358, filed on Jun. 12, 2012, now abandoned.

(60) Provisional application No. 61/496,158, filed on Jun. 13, 2011, provisional application No. 61/527,749, filed on Aug. 26, 2011.

(51) Int. Cl.
*H04W 52/24* (2009.01)
*H04W 52/16* (2009.01)
(Continued)

(52) U.S. Cl.
CPC .......... *H04W 52/242* (2013.01); *H04L 5/0007* (2013.01); *H04W 52/16* (2013.01); *H04W 52/383* (2013.01); *H04W 72/0406* (2013.01); *H04W 52/46* (2013.01); *H04W 88/08* (2013.01)

(58) Field of Classification Search
CPC .. H04W 52/10; H04W 52/242; H04W 52/06
See application file for complete search history.

(56) References Cited

U.S. PATENT DOCUMENTS

2002/0168993 A1* 11/2002 Choi ............... H04W 52/10
                                                          455/522
2005/0111383 A1    5/2005 Grob et al.
(Continued)

FOREIGN PATENT DOCUMENTS

CN          1491048 A       4/2004
WO     2011/051745 A1       5/2011

OTHER PUBLICATIONS

Draft Amendment to IEEE Standard for Local and metropolitan area networks; Part 16: Air Interface for Broadband Wireless Access Systems, Advanced Air Interface, IEEE P802.16m/D12 (Feb. 17, 2011).

(Continued)

*Primary Examiner* — Albert T Chou
(74) *Attorney, Agent, or Firm* — Volpe and Koenig, P.C.

(57) ABSTRACT

Method and apparatus for controlling a transmit power of a mobile station are disclosed. Mobile stations in direct communication on a cross link (XL) receive control parameters from a base station. A first mobile station (a receiving mobile station) may calculate a correction parameter for power offset for transmissions from a second mobile station (a transmitting mobile station) to the first mobile station, and send it to the second mobile station. The correction parameter may be generated within the maximum and minimum limits. The second mobile station may calculate a transmit power level for a transmission to the first mobile station based on the correction parameter, measurements on resources allocated for cross links for mobile station-to-mobile station direct communications, an interference measurement received from the first mobile station, and a path loss to the first mobile station.

18 Claims, 7 Drawing Sheets

(51) Int. Cl.
*H04W 52/38* (2009.01)
*H04L 5/00* (2006.01)
*H04W 72/04* (2009.01)
*H04W 52/46* (2009.01)
*H04W 88/08* (2009.01)

(56) References Cited

U.S. PATENT DOCUMENTS

| | | | |
|---|---|---|---|
| 2005/0208961 | A1 | 9/2005 | Willenegger |
| 2006/0035660 | A1* | 2/2006 | Anderson ............ H04W 52/06 455/522 |
| 2006/0217143 | A1 | 9/2006 | Baker et al. |
| 2007/0060057 | A1* | 3/2007 | Matsuo ............... H04B 1/0475 455/63.1 |
| 2009/0280857 | A1 | 11/2009 | Batra et al. |
| 2011/0096760 | A1* | 4/2011 | Lee .................... H04W 52/242 370/338 |
| 2012/0044815 | A1 | 2/2012 | Geirhofer et al. |
| 2013/0077661 | A1 | 3/2013 | Jacobsen et al. |

OTHER PUBLICATIONS

IEEE Standard for Local and metropolitan area networks; Part 16: Air Interface for Broadband Wireless Access Systems, IEEE Std 802.16-2009 (May 29, 2009).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5; Enhancements for Higher Throughput, IEEE Std 802.11n-2009 (Sep. 11, 2009).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).

Third Generation Partnership Project, "Technical Specification Group Radio Access Network; Evolved Universal Terrestrial Radio Access (E-UTRA); Multiplexing and channel coding (Release 9)," 3GPP TS 36.212 V9.3.0 (Sep. 2010).

Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.1.0 (Mar. 2011).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.5.0 (Mar. 2012).

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).

Third Generation Partnership Project, "Technical Specification Group Radio Access Network; Evolved Universal Terrestrial Radio Access (E-UTRA); Physical layer procedures (Release 10)," 3GPP TS 36.213 V10.1.0 (Mar. 2011).

Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).

\* cited by examiner

METHOD FOR CONTROLLING TRANSMIT POWER OF A MOBILE STATION

CROSS REFERENCE TO RELATED APPLICATIONS

This application is a continuation of U.S. patent application Ser. No. 13/494,358 filed Jun. 12, 2012, which claims the benefit of U.S. provisional application No. 61/496,158 filed Jun. 13, 2011 and 61/527,749 filed Aug. 26, 2011, the contents of which are hereby incorporated by reference herein.

BACKGROUND

Standards setting organizations have recently started to consider non-traditional applications for cellular networks that involve communications not initiated by humans and or not using strictly hierarchical topologies. In both European Telecommunications Standards Institute/Third Generation Partnership Project (ETSI/3GPP) and IEEE 802.16, study/work items have been initiated which consider machine-to-machine (M2M) communication or machine type communication (MTC). The M2M communications and MTC are defined as communications initiated by a machine to communicate with either other machines or with humans. In addition, the IEEE 802.16, under the 802.16n project, has started to study and specify new network topologies which include mobile station-to-mobile station direct communications (also called peer-to-peer communication) which may be used for coverage extension and/or for throughput improvement.

SUMMARY

Method and apparatus for controlling a transmit power of a mobile station are disclosed. Mobile stations in direct communication on a cross link (XL) receive control parameters from a base station. A first mobile station (a receiving mobile station) may calculate a correction parameter for power offset for transmissions from a second mobile station (a transmitting mobile station) to the first mobile station, and send it to the second mobile station. The correction parameter may be generated within the maximum and minimum limits configured by the base station. The second mobile station may calculate a transmit power level for a transmission to the first mobile station based on the correction parameter, its own measurements on resources allocated for cross links for mobile station-to-mobile station direct communications, an interference measurement received from the first mobile station, and a path loss to the first mobile station, etc.

BRIEF DESCRIPTION OF THE DRAWINGS

A more detailed understanding may be had from the following description, given by way of example in conjunction with the accompanying drawings wherein.

DETAILED DESCRIPTION

Figure 1A:
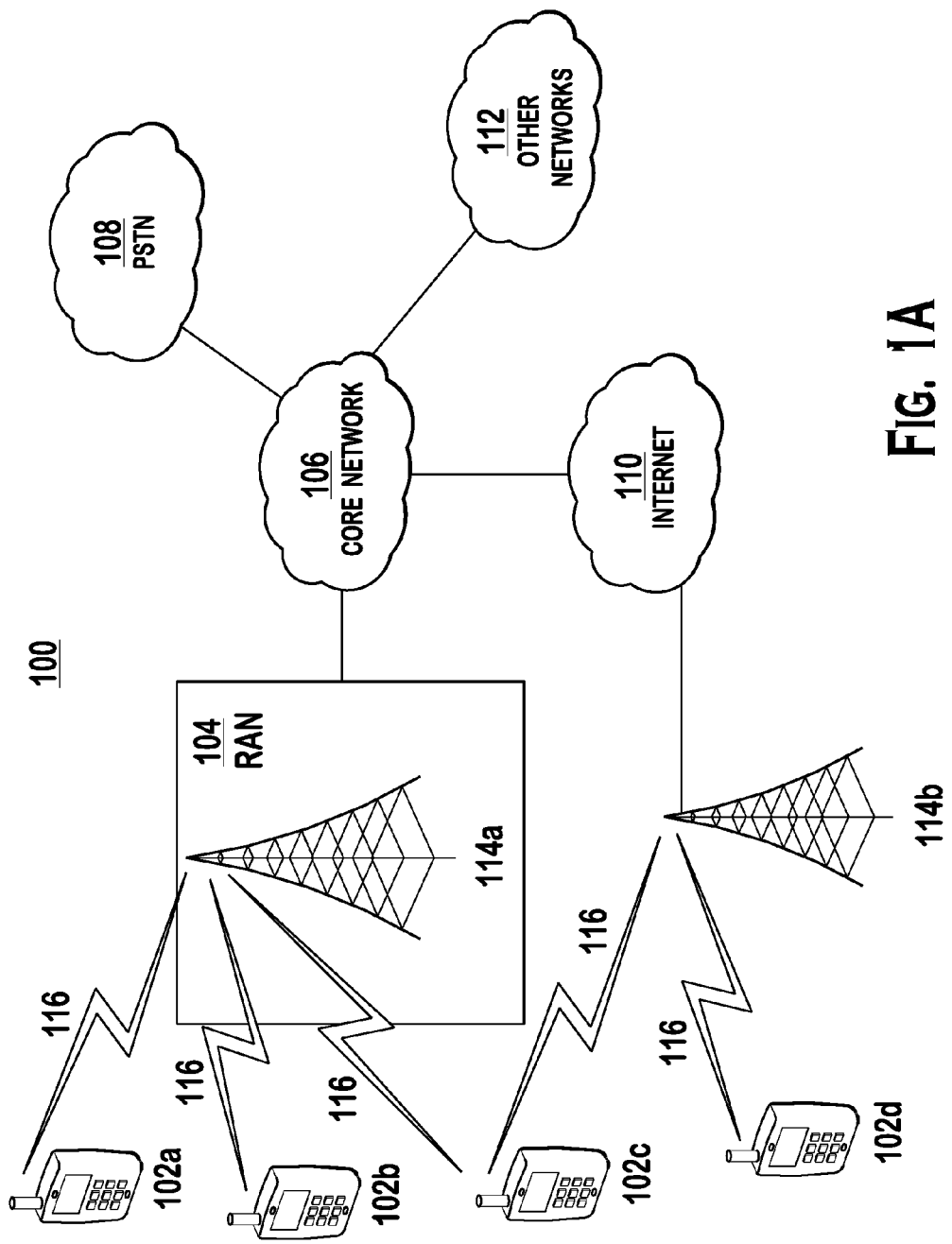
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit or station, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
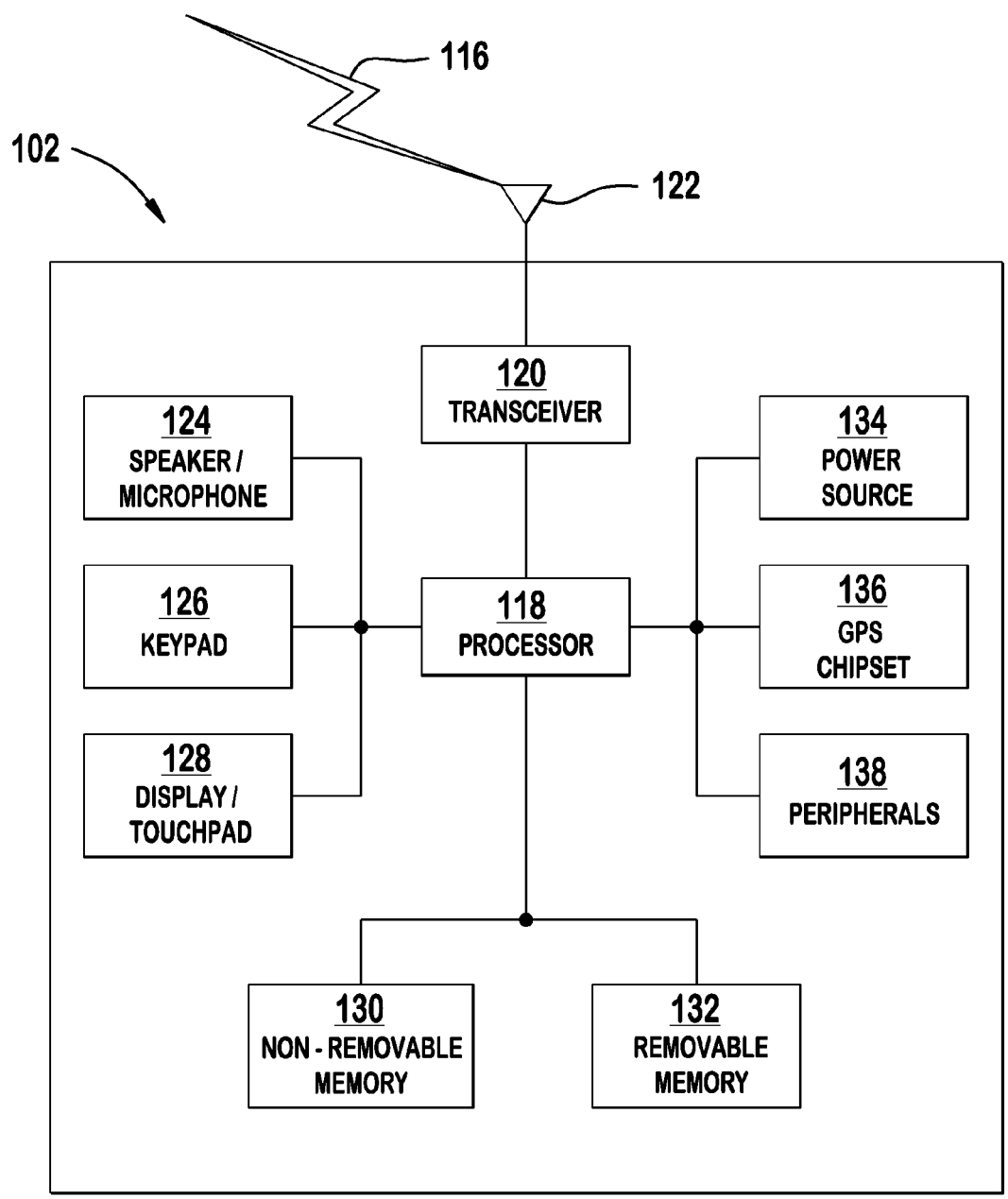
FIG. 1B is a system diagram of an example wireless transmit/receive unit (WTRU) that may be used within the communications system illustrated in FIG. 1A.

FIG. 1B is a system diagram of an example WTRU 102, (i.e., a mobile station (MS) or a subscriber station (SS)). As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
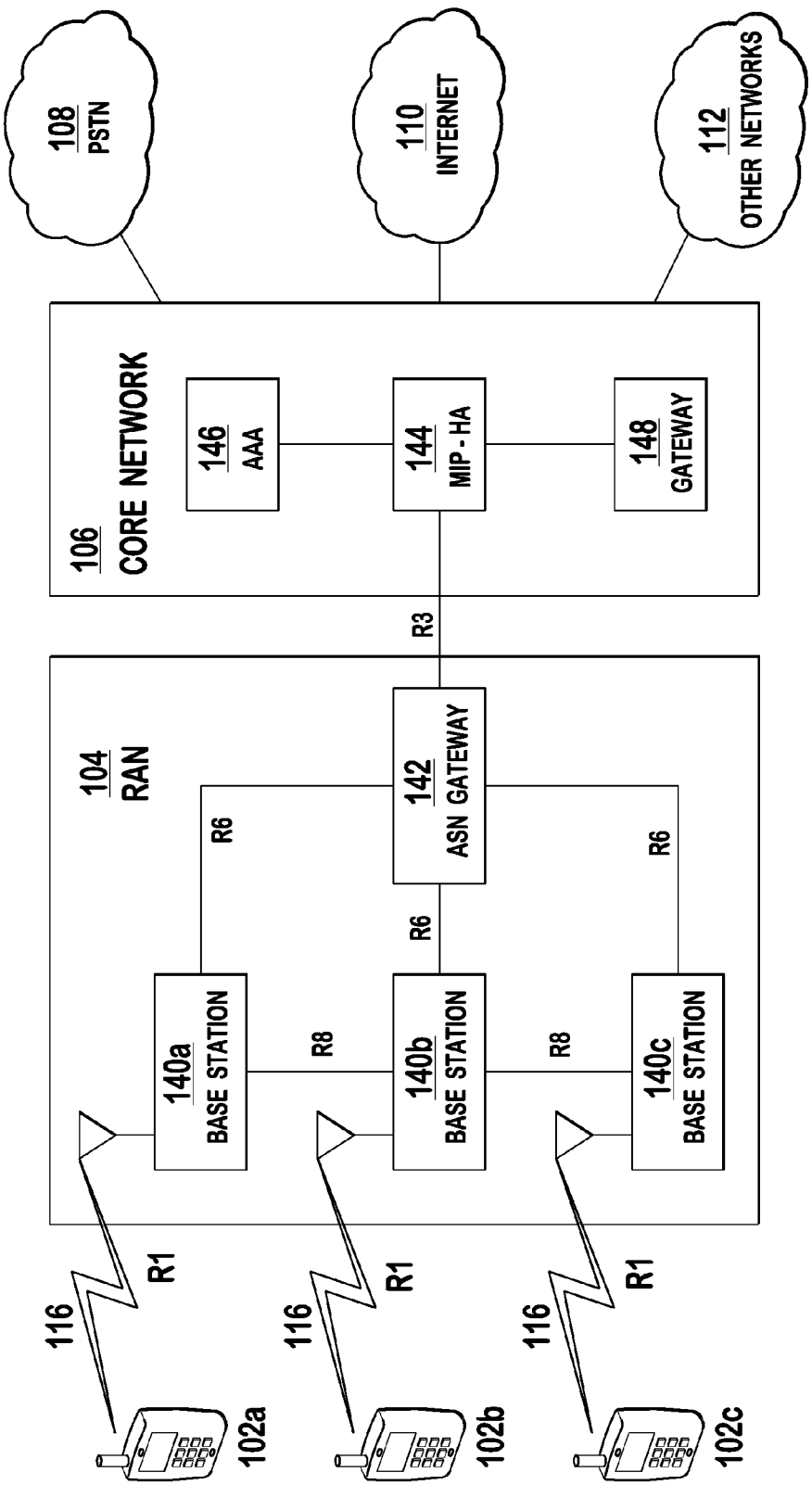
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

A subscriber station" (SS) or a mobile station (MS) is a non-infrastructure node (infrastructure node being e.g., a base station (BS) or a relay). The terms SS and MS will be used interchangeably. A peer subscriber station (PSS) is an SS or an MS that is involved in the peer-to-peer communication. A terminal PSS (TPSS) is a PSS which is helped by a forwarding PSS (FPSS). An FPSS is a PSS which forwards data between the TPSS and an infrastructure node for the TPSS. A cross link (XL) is a link between two subscriber stations. A traditional link (TRL) is a link between an SS and an infrastructure node.

Figure 2:
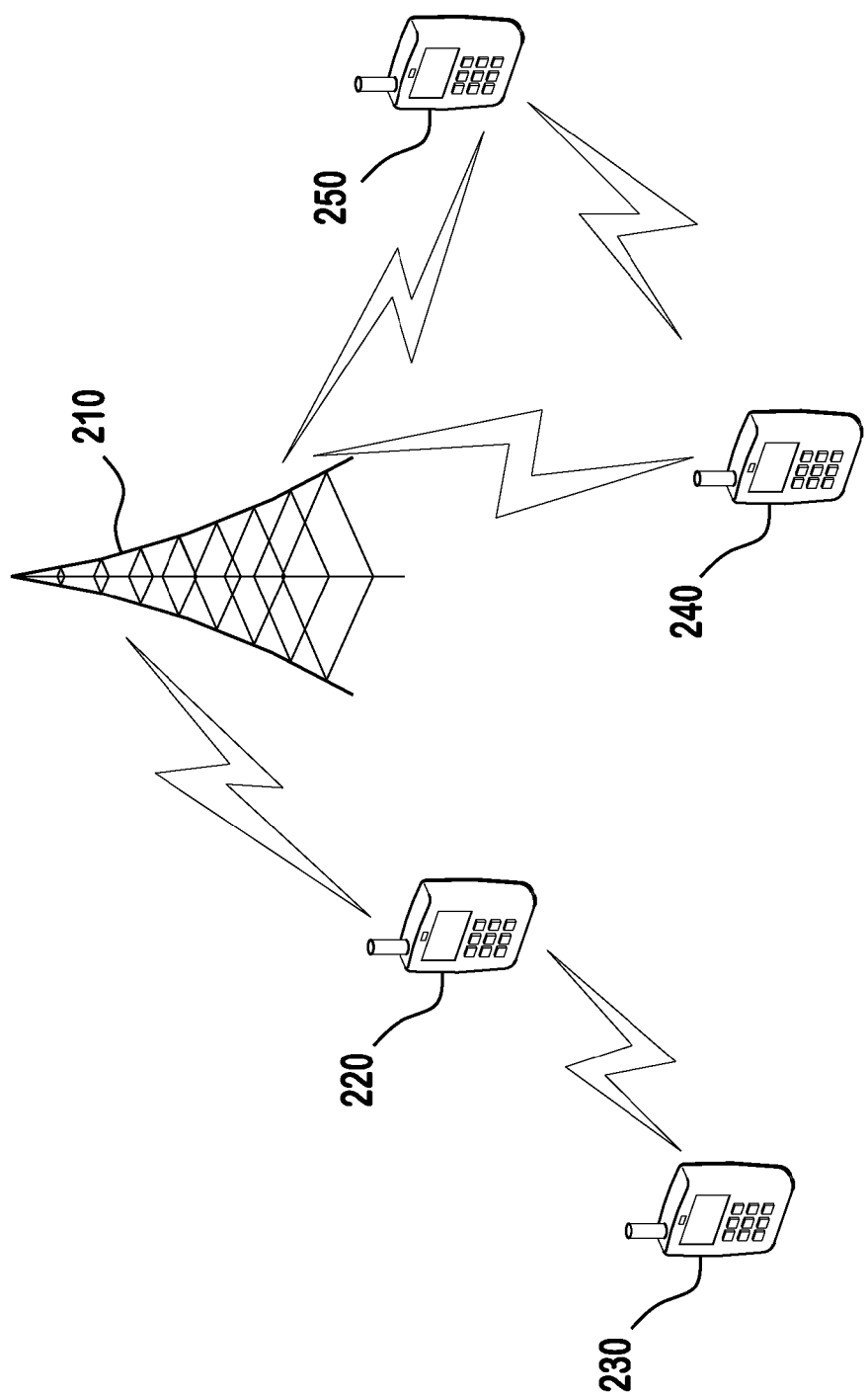
FIG. 2 is a system diagram which shows an example case of mobile stations in direct communication on an XL while at least one of the mobile stations in the direct communication is under the control of base station.

FIG. 2 shows an example case of mobile stations 220, 230, 240, 250 in direct communication on an XL while at least one of the mobile stations in the direct communication is under the control of BS 210. One MS (MS 220 in this example) may be attached to BS 210 and the other MS (MS 230 in this example) may not be attached to BS 210. In such case, MS 230 transmits and receives to and from MS 210, and MS 210 may work as a relay for MS 230, (i.e., MS forwarding/relaying). Alternatively, both mobile stations 240, 250 of the direct communication may be attached to BS 210 and transmit and receive to and from BS 210 on the TRL.

MS forwarding (relaying) is used for coverage extension in which an MS called FPSS (e.g., MS 220 in FIG. 2) forwards data to/from an MS called TPSS (e.g., MS 230 in FIG. 2) and the network. At least the FPSS is in the coverage of, and attached to, an infrastructure node (e.g., a BS or a relay). The data rate that can be supported between the TPSS and the FPSS and between the FPSS and the infrastructure node may be significantly higher than can be supported between the TPSS and the infrastructure node.

MS direct communications may be used for throughput enhancement in which the two mobile stations are the source and sink of the data respectively. At least one of the mobile stations may be in coverage of and attached to an infrastructure node. When both mobile stations are attached, the direct communication may be used when the data rate between the mobile stations is significantly higher than that of the MS to the BS, or when doing so will increase cell throughput.

Higher cell throughput can be achieved when resources (e.g., time and frequency resources as in orthogonal frequency division multiple access (OFDMA)) are reused throughout the cell. Achieving a higher throughput depends on the perceived spatial separation of the links which is maximized as the XL transmission power is reduced. On the other hand using transmission power that is too low will increase error rate and therefore increase interference by increasing the number of retransmissions. An optimal point may exist and it is the task of power control procedures to maintain transmission levels at or about that optimal point. Both directions of the XL as well as the TRL may be power-controlled.

The transmit power of the MS may be fully or partially controlled by the BS. The BS maintains the overall level of cell performance by controlling the transmit power and interference. The BS may instruct the transmitting MS and receiving MS on the XL and TRL and other mobile stations or other base stations to report measurements, and perform transmit power control based on the measurements. The measurements include, but are not limited to, measurements that determine the success of links such as packet error rate and hybrid automatic repeat request (HARQ) residual errors, measurements that determine received levels of specific signals on specific resources, measurements that determine interference levels on specific resources, measurements obtained in other cells by other base stations, and the like.

The embodiments disclosed herein are applicable to both relaying (MS forwarding) and MS-to-MS direct communications, and TRL transmissions as well. It should be noted that embodiments will be explained with reference to IEEE 802.16-2009 or 802.16.1, but the embodiments are applicable to any wireless communication systems including, but not limited to, WCDMA, LTE, cdma2000, and the like.

IEEE 802.16.1 specifies the power control formula for uplink transmissions. A transmitting MS calculates the power per subcarrier and per stream according to the following equation:

$$P = L + SINR_{Target} + NI + \text{Offset},  \quad \text{Equation (1)}$$

where P is the transmit power level (dBm) per stream and per subcarrier, L is the estimated average DL propagation loss calculated by the MS, $SINR_{Target}$ is the target uplink signal-to-interference and noise ratio (SINR) needed at the BS, NI is the estimated average power level of the noise and interference per subcarrier at the BS, that is broadcast by the BS, and Offset is a correction factor for MS-specific power offset that is controlled by the BS through power control messages.

For data channels, including those used for MAC frames, the transmitting MS calculates the target SINR as follows:

$$SINR_{Target} 10 \log_{10}(\max(10^{SINR_{MIN}(dB)/10}, \gamma_{IoT}SIR_{DL}-\alpha))-\beta \times 10 \log_{10}(TNS). \qquad \text{Equation (2)}$$

where $SINR_{MIN}(dB)$ is the SINR requirement (i.e., dataSinrMin) for the minimum rate expected by the BS, $\gamma_{IoT}$ is the fairness and interference over thermal (IoT) control factor broadcasted, $SIR_{DL}$ is the linear ratio of the downlink signal-to-interference ratio (SIR) measured by the MS on DL resources used by its serving BS, α is a factor that depends on the number of receive antennas at the receiving MS, β is set to one to account for number of streams, otherwise it is set to zero, and TNS is the total number of streams. In case of multi-user MIMO (MU-MIMO) it represents the aggregated number of streams.

In equation (2), the target SINR is determined by the transmitting MS in terms of DL SIR, SINR minimum, correction parameters related to the number of streams and the number of receiving antennas at the BS, and a correction factor which takes into account inter-cell interference.

For control channels, $SINR_{Target}$ may be signaled from the BS for each type of control channel. Examples of control channels are HARQ feedback, synchronized ranging, primary and secondary feedback channels, and the bandwidth request channel. For control channels, the Offset in equation (1) is set to $Offset_{control}$ and the BS may change the $Offset_{control}$ value by sending physical layer messages (PC-A-MAP), which is adjusted by the MS as follows:

$$Offset_{Control}=Offset_{Control}+\Delta_{Power\_Adjust}. \qquad \text{Equation (3)}$$

IEEE 802.16-2009 specifies closed loop and open loop power control procedures. For closed loop power control, the power is updated when coding rate changes or when instructed to do so by the BS using a fast power control (FPC) MAC control message as follows:

$$P_{new}=P_{last}+(C/N_{new}-C/N_{last})-(10 \log_{10}(R_{new})-10 \log_{10}(R_{last}))+Offset; \qquad \text{Equation (4)}$$

where $P_{new}$ is the power of the new UL burst in the current UL frame, $C/N_{new}$ is the normalized C/N for the new UL burst in the current UL frame, $R_{new}$ is the repetition factor R for the new UL burst in the current UL frame, $P_{last}$ is the power of the burst with the maximum value of (C/N−10 $\log_{10}(R)$) in the most recently transmitted UL frame, $C/N_{last}$ is the normalized C/N associated with $P_{last}$ (thus referring to the burst with the maximum value of (C/N−10 $\log_{10}(R)$) in the most recently transmitted UL frame), $R_{last}$ is the repetition factor R associated with $P_{last}$ (thus referring to the burst with the maximum value of (C/N−10 $\log_{10}(R)$) in the most recently transmitted UL frame), and Offset is an accumulation of power correction terms sent by the BS since the last transmission.

The formula for the open loop power control is as follows:

$$P=L+C/N+NI-10 \log_{10}(R)+Offset\_SS_{perSS}+Offset\_BS_{perSS}; \qquad \text{Equation (5)}$$

where P is the TX power level (dBm) per a subcarrier for the current transmission, including MS Tx antenna gain, L is the estimated average current UL propagation loss including MS Tx antenna gain and path loss, but excluding the BS Rx antenna gain, C/N is the normalized C/N of the modulation and forward error correction (FEC) rate for the current transmission, R is the number of repetitions for the modulation/FEC rate, NI is the estimated average power level (dBm) of the noise and interference per a subcarrier at the BS, not including BS Rx antenna gain, $Offset\_SS_{perSS}$ is the correction term for SS-specific power offset, which is controlled by the SS and its initial value is zero, and $Offset\_BS_{perSS}$ is the correction term for SS-specific power offset, which is controlled by the BS with power control messages. When $Offset\_BS_{perSS}$ is set through the PMC_RSP message, it includes BS Rx antenna gain. Note that the procedure uses the average path loss, not the instantaneous path loss.

Embodiments are disclosed for a transmit power control of a transmitting MS that transmits data or control signal either to another MS (a receiving MS) on an XL or to a BS on a TRL.

The transmitting MS calculates a transmit power level based on equations (1)-(5) or their modifications. The transmitting MS calculates a path loss (a propagation loss) based on the received power level from the receiving node (either MS or an infrastructure node). Rather than instantaneous path loss estimates, average path loss estimates may be calculated and used for calculating the transmit power level. Fast fading may be handled by modifying the coding and/or modulation parameters.

A receiving MS may send a reference signal, (e.g., beacon, pilot, preamble, etc.) to the transmitting MS at a known power level. The reference signal may be identifiable to a specific MS, (i.e., the receiving MS). An 802.16.1 secondary advanced preamble (SA-Preamble) may be used. That power level is known or made known to the transmitting MS or to the entity which issues power control commands to the transmitting MS.

The power control parameters (e.g., a correction term for MS-specific power offset, such as Offset in equation (1)) may be generated by the BS and signaled to the transmitting MS, either directly or indirectly, (i.e., forwarded through another MS in both MS-to-MS direct communication case and MS forwarding case), in order to provide corrections to the transmit power level. Some control parameters may be broadcast.

Alternatively, the power control parameter(s) (e.g., a correction term for MS-specific power offset, such as Offset in equation (1)) may be generated by the receiving MS and signaled to the transmitting MS. The receiving MS may generate the offset parameter(s) based on its own reception from the transmitting MS and parameters configured by the BS. Alternatively, the receiving MS may generate the offset parameter(s) based on its own reception from the transmitting MS without the control by the base station. The receiving MS may be allowed to vary the offset parameter(s) between the configured minimum and maximum values (Offset_min and Offset_max). The values of Offset_min and Offset_max may be determined by the BS and forwarded to the receiving MS (either directly or via another MS). Initial values may be transmitted during initial MS-to-MS association.

Alternatively, the receiving MS may be allowed to vary the offset parameter(s) in a configured range (e.g., given by a maximum of +/−Offset_change_range) from the last value used in a given time. In that case the given time may be pre-defined or signaled by the BS.

Alternatively, the offset parameter(s) may be defined as the sum of a BS determined part and an MS determined part as follows:

$$\text{Offset} = \text{Offset}\_m + \text{Offset}\_b, \quad \text{Equation (6)}$$

where Offset_m is determined by the MS, for example based on an average packet error rate, and Offset_b is determined by the BS, for example to control cell interference. Offset_b may be transmitted from the BS. This alternative may be combined with either of the alternative embodiments above.

If the range constraints in the above three embodiments need to be exceeded, the receiving MS may send a message to the BS (either directly or via another MS) requesting change of these constraints.

Alternatively, the receiving MS may generate an unconstrained offset parameter(s) and transmit it to the transmitting MS, and the offset values may then be clipped to the minimum or maximum at the transmitting MS.

The XL may fail for any reason, for example due to insufficient power that may be caused by the clipping of the offset parameter. The XL may be monitored and any failure of the XL may be reported to the BS and the BS may adjust the values.

Figure 3:
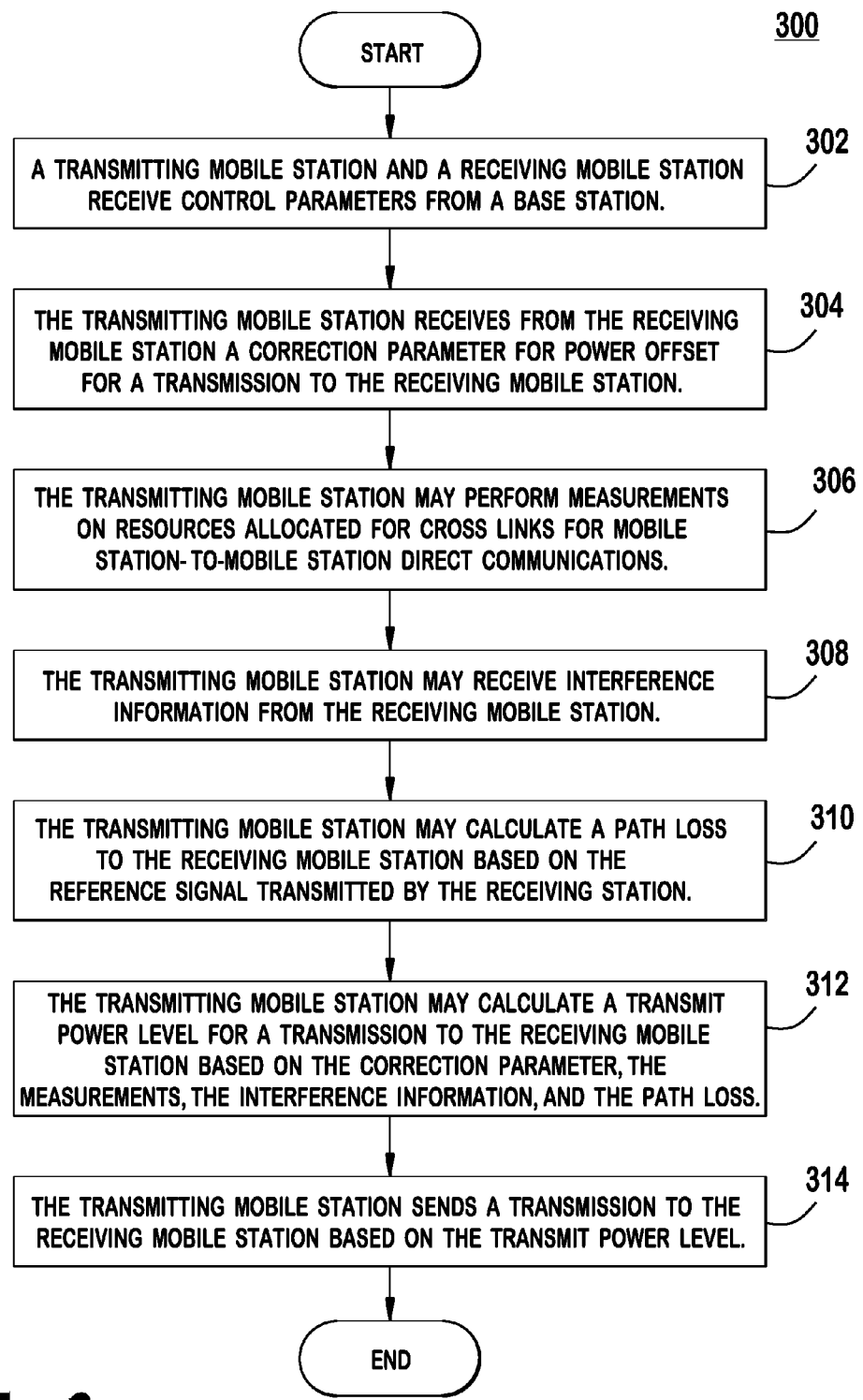
FIG. 3 is a flow diagram of a process for transmit power control at a mobile station in accordance with one embodiment.

FIG. 3 is a flow diagram of a process 300 for transmit power control at a mobile station in accordance with one embodiment. A transmitting MS and a receiving MS receive control parameters from a base station (302). The control parameters may be sent directly to the mobile stations or via another MS.

The transmitting MS receives from the receiving MS a correction parameter for power offset for a transmission to the receiving MS (304). The receiving MS calculates the correction parameter for power offset for transmission from the transmitting MS to the receiving MS based on the data received on the XL. The correction parameter may be generated within the maximum and minimum limits configured by the base station.

The transmitting MS may perform measurements on resources allocated for cross links for mobile station-to-mobile station direct communications (306). The transmitting MS may receive interference measurement (e.g., IoT value) from the receiving MS (308). The transmitting MS may calculate a path loss to the receiving MS based on the reference signal transmitted by the receiving MS (310).

The transmitting MS may calculate a transmit power level for a transmission to the receiving MS based on the correction parameter, its own measurements, the interference measurement from the receiving MS, and the path loss (312). The transmitting MS sends a transmission to the receiving MS based on the transmit power level (314).

When operating in frequency division duplex (FDD) XL transmissions between mobile stations may occur in the UL band only, in the DL band only, or both. When operating in time division duplex (TDD) XL transmissions between mobile stations may occur in the UL zone only, in the DL zone only, or in both UL and DL zones. The UL zones are resources configured for UL transmissions and the DL zones are resources configured for DL transmissions. For example, in the MS forwarding case, the FPSS transmissions may occur in the DL zone in TDD (DL band in FDD) and the TPSS transmissions may occur in the UL zone in TDD (UL band in FDD). In the MS-to-MS direct communications case, the MS that is attached to the BS (or in case both are attached to the BS, the MS that has a better path to the BS) may transmit in the DL zone in TDD (DL band in FDD) and the other may transmit in the UL zone in TDD (UL band in FDD). At least one of the mobile stations involved in the direct communication on an XL may be attached to a BS. It should be understood that the power control procedures in accordance with embodiments descried herein do not depend on the duplex mode and may apply equally to both FDD and TDD, i.e., whether in the UL band (FDD) or in the UL zone (TDD), or in the DL band (FDD) or in the DL zone (TDD). The embodiments will be described in terms of UL and DL zones for TDD operations, but they are also applicable to FDD operations.

In case where XL transmissions occur in the UL zone only, the TRL UL transmissions may cause interference to another TRL UL transmissions at a BS (whether inter-cell or intra-cell in MU-MIMO), or XL transmissions at a receiving MS, and the XL transmission may cause interference to TRL UL transmissions at a BS or another XL transmissions at a receiving MS.

Figure 4:
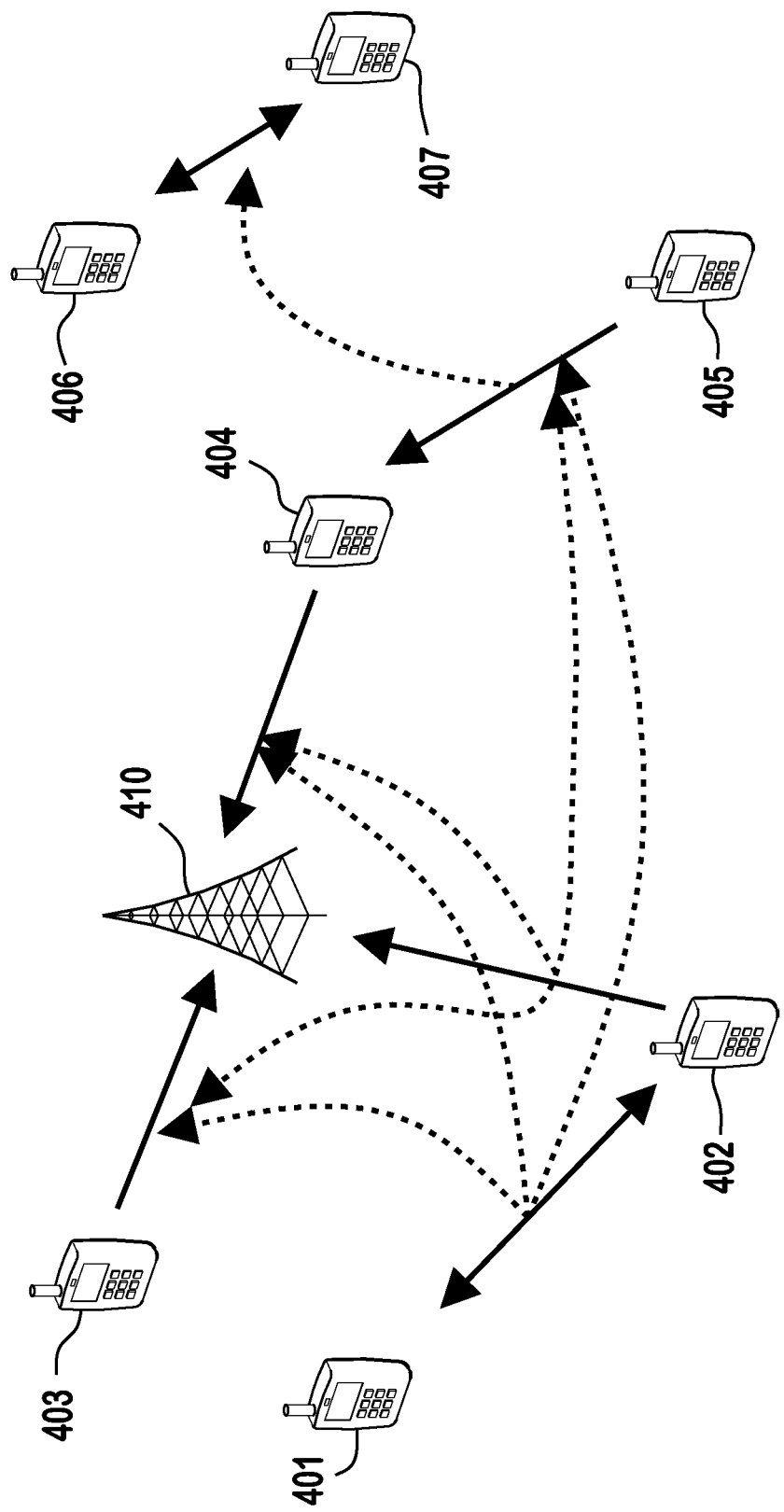
FIG. 4 is a system diagram which shows interference caused by uplink (UL) transmissions where XL transmissions occur in the UL zone only.

FIG. 4 shows interference caused by UL transmissions where XL transmissions occur in the UL zone only. In FIG. 4, the sold line represents TRL or XL transmissions, and the dashed line represents interference caused by the TRL or XL transmissions. In FIG. 4, MS 401 and MS 402 communicate on the XL while under the control of the BS 410. MS 404 forwards data to the BS 410 for MS 405. MS 406 and MS 407 also communicate on an XL. MS 405, 406, 407 are out of coverage of BS 410. The TRL UL transmission from MS 402 to BS 410 and XL transmission between MS 401 and MS 402 interfere with TRL UL transmission from MS 403 to BS 410, XL transmission from MS 405 to MS 404, and TRL UL transmission from MS 404 to BS 410. The XL transmission from MS 405 to MS 404 on XL may or may not cause interference to other TRL UL transmissions but may interfere with other XL transmission, such as XL transmission between MS 406 and MS 407. It should be noted that not all interfering pairs are depicted in FIG. 4 for simplicity.

In case where XL transmissions occur in the UL zone only, TRL DL transmissions may not be affected. The power control may consider the interference at the BS and the interference on other XL. MS that are not receiving on an XL may not be affected by the XL transmissions. The XL power control takes into account the BS interference measurements as well as interference measurements measured in the UL by those MS that receive in the UL.

Embodiments for power control in case where XL transmissions occur in the UL zone only and both MS involved in the direct communication on an XL are attached to the BS are explained hereafter. For the sake of simplicity it is assumed that the mobile stations that are involved in the direct communication on an XL are associated with the same infrastructure node. However, the mobile stations involved in the direct communication on the XL may be associated with different infrastructure nodes, and in such case, the two infrastructure nodes may share the information for controlling the transmit power of the mobile stations on the XL. The resource allocations may be sent to each MS involved in the direct communication from its serving BS, and the transmit power may be controlled by the serving BS. The mobile stations involved in the direct communication on the XL may transmit MAC control frames directly to the serving BS, and that transmissions may be power controlled by the BS (e.g., same as data packets for 802.16.1). Control channels may also be transmitted directly to a serving BS and are power controlled (e.g., as in 802.16.1 control channels). Data packets may be sent to the BS (TRL) or to the peer MS (XL).

For transmit power control when transmitting to the BS (i.e., interference is caused by TRL UL transmissions to other BS (TRL) and to other XL), in one embodiment, the BS may adjust the TRL UL transmission power of the transmitting MS so as not to interfere with transmissions on the XL and with inter-cell or MU-MIMO reception at the BS based on the measurements reported from mobile stations and/or neighbor base station(s).

The BS may direct mobile stations in a cell and other neighbor base station(s) to report measurements. The measurements may include, but are not limited to, measurements that determine the success of links such as packet error rate, HARQ residual errors, measurements that determine received level of specific signals on specific resources, measurements that determine interference levels on specific resources, measurements obtained in other cell by other BS, and the like. For example, in order to obtain the level of interference on an XL, the BS may instruct the mobile stations involved in the direct communication to measure the interference on UL resources and report to the BS.

The measurements may be defined either statistically or deterministically. In the statistical measurement method, mobile stations may be instructed by the BS to measure certain resources (in terms of time and frequency) at certain instances (e.g., periodically) per measurement interval. The number and epochs of measurements may be left to MS implementation. The measurement interval may be on the order of hundreds of milliseconds. The resources that the mobile stations need to measure may be the resources that are used for XL transmissions by any mobile stations. The BS may know that certain time and frequency resources are typically allocated to XL, for example, in every frame or sub-frame, and the BS may provide the time and frequency information to the measuring mobile stations. Reporting of the measurements may be averaged over the frequency, over time, or both. If the measurements are averaged, the correction term for power offset (e.g., Offset) may be sent less often using, for example, MAC control messages rather than PHY signaling.

In the deterministic measurement method, the mobile stations may be instructed to measure on specific time and frequency resources. The time and frequency resources may be the same resources assigned for the measuring MS for XL reception. In this embodiment, the measurements may not be averaged over time and/or frequency resources, rather may be measured and reported in time and frequency resources where the source of the interference is known to the BS. It may still be averaged over several measurement epochs as described above.

For implementation in an 802.16.1 system, the transmitting MS may calculate the power in accordance with equation (1). For a data channel, the transmitting MS may calculate the power in accordance with equation (2). Interference to other mobile stations receiving on an XL or to serving or other BS may be controlled by the serving BS by adjusting and transmitting its correction factor Offset (either semi-statically or dynamically).

For implementation in an 802.16-2009 system, either closed loop (equation (3)) or open loop (equation (4)) power control may be used. The BS may consider the inter-cell interference in determining the correction factor Offset or Offset_BS$_{perSS}$ for the closed and open loop power control, respectively. Interference to other mobile stations receiving on an XL may be controlled by the BS by adjusting and transmitting its correction factor Offset or Offset_BS$_{perSS}$, for the closed and open loop power control, respectively (either semi-statically or dynamically).

In another embodiment, the BS adjusts the MS transmission power by transmitting values for Offset and the transmitting MS measures interference on an XL and adjusts the transmit power considering the interference on the XL. The transmitting MS calculates the transmit power per stream and per subcarrier for the current transmission and SINR$_{Target}$ as follows:

$$P = L + SINR_{Target} + NI + Offset, \quad \text{Equation (7)}$$

$$SINR_{Target} = 10 \log_{10}(\max(10^{SINRMIN(dB)/10}, f(\gamma_{IoT} SIR_{DL}, \delta_{XL} SIR_{XL}) - \alpha)) - \beta \times 10 \log_{10}(TNS), \quad \text{Equation (8)}$$

where $f(au, bv) = f(\gamma_{IoT} SIR_{DL}, \delta_{XL} SIR_{XL})$ in equation (8) is any non-decreasing function of u and v. For example, the following functions may be used:

$$f(au, bv) = au + bv; \quad \text{Equation (9)}$$

$$f(au, bv) = \max(au, bv); \quad \text{Equation (10)}$$

$$f(u, v) = \sqrt{(ab)uv}; \quad \text{Equation (11)}$$

In equation (11), $\gamma_{IoT}, \delta_{XL}$ may be combined into one parameter.

Using equation (9), equation (8) may be rewritten as follows:

$$SINR_{Target} = 10 \log_{10}(\max(10^{SINRMIN(dB)/10}, \gamma_{IoT} SIR_{DL} + \delta_{XL} SIR_{XL} - \alpha)) - \times 10 \log_{10}(TNS). \quad \text{Equation (12)}$$

SINR$_{Target}$ is the target UL SINR needed at the receiving MS, P is the TX power level (dBm) per stream and per subcarrier for the current transmission, L is the estimated average current DL propagation loss calculated by the MS including MS's TX antenna gain and path loss, NI is the estimated average power level (dBm) of the noise and interference per subcarrier at the receiving MS, Offset is a correction term for MS-specific power offset, which is controlled by the BS through power control messages, SINR$_{MIN}$(dB) is the SINR requirement (dataSinrMin) for the minimum rate expected by the BS, $\gamma_{IoT}$ is the fairness and IoT control factor broadcasted, SIR$_{DL}$ is the linear ratio of the downlink signal to interference power measured by the MS on DL resources used by its serving BS, $\alpha$ is a factor that depends on the number of receive antennas at the receiving MS, $\beta$ is set to one to account for number of streams, otherwise it is set to zero, TNS is the total number of streams (in case of MU-MIMO it represents the aggregated number of streams), $\delta_{XL}$ is fairness parameters for XL interference, and SIR$_{XL}$ is the linear ratio of the XL signal to interference power as received by the power controlled MS, measured on UL resources used by the XL. The BS may determine which resources to measure on for the SIR$_{XL}$. The measurements may be of the XL on which the MS is receiving its own XL data. However, other resources may be measured as well.

In this embodiment, the transmitting MS compensates for interference to other MS in XL by monitoring its XL receiving SINR and interference to other BS by monitoring DL SINR from the serving BS. The parameters $\gamma_{IoT}$ and $\delta_{XL}$ together control the tradeoff between own signal SINR and interference to other BS or other MS (on XL), respectively. They may be signaled by the BS or may be broadcast.

For transmit power control when transmitting to another MS (i.e., interference is caused by the XL transmissions to the BS (serving BS and other BS) and to other XL), in one embodiment, the BS may control the MS power taking into account the interference to itself and other BS, the SIR at the receiving MS, and the interference on other MS. The BS may instruct the mobile stations in a cell and neighbor base station(s) to perform measurements and report them to the BS, and adjusts the power control parameters (e.g., Offset in equation (1)) based on the reported measurements. SINR$_{Min}$ in equation (2) may be pre-determined or signaled by the BS. The required SINR at the receiving MS may be maintained by the modulation and coding scheme (MCS) selection and by use of Offset parameter transmitted by the BS. The measurements may be sent semi-statically or dynamically.

The transmitting MS may send to the BS its receive power level of a preamble transmitted by the receiving MS. The transmit power level of the preamble may be known at the BS.

The receiving MS may signal averaged SINR measurements to its serving BS. In this case, Offset corrections from the BS may be sent semi-statically. Alternatively, the receiving MS may send packet error rate (HARQ retransmissions rate) or the like instead of the averaged SINR. For dynamic operation, the receiving MS may signal without averaging a received SINR or HARQ retransmission rate information to the BS.

For the case of MS forwarding (where both MS on the XL are under the control of the BS), as XL and TRL transmissions are scheduled by the BS (e.g., with persistent scheduling), the actual forwarding of the packet (from the FPSS to the BS) implies successful reception on XL (from the TPSS to the FPSS) such that explicit HARQ success information may not be required. In this case, a bit error rate information may be sent to the BS.

For implementation in an 802.16.1 system, the transmitting MS may calculate the power in accordance with equations (1) and (2). Interference to other mobile stations receiving on an XL is controlled by the BS by adjusting and transmitting its correction factor Offset in equation (1) (either semi-statically or dynamically).

For implementation in an 802.16-2009 system, either closed loop (equation (3)) or open loop (equation (4)) power control may be used. The BS may consider the inter-cell interference in determining Offset or $Offset\_BS_{perSS}$ for closed or open loop procedures, respectively. Interference to other MS receiving in XL is controlled by the BS by adjusting and transmitting its correction factor Offset or $Offset\_BS_{perSS}$, for closed or open loop procedures, respectively (either semi-statically or dynamically).

In another embodiment, similar to the embodiment for TRL UL transmissions, the BS may adjust a transmission power by transmitting values for Offset and the transmitting MS measures interference on an XL and adjusts the transmit power considering the interference on the XL. The transmitting MS may calculate the transmit power per stream and per subcarrier for the current transmission and $SINR_{Target}$ in accordance with equations (7)-(12).

In another embodiment, when transmitting to another MS on an XL, a power control command may be generated by the receiving MS on the XL based on parameters provided by the BS, for example, including parameters that control the correction parameter Offset. The offset parameter(s) (i.e., a correction term for MS-specific power offset) may be generated by the receiving MS (e.g., the TPSS) and signaled to the transmitting MS (e.g., the FPSS). The receiving MS may generate the offset parameter(s) based on its own reception of the data and parameters configured by the BS. The receiving MS (e.g., TPSS) may be allowed to vary the offset parameter(s) between the configured minimum and maximum values (Offset_min and Offset_max). The values of Offset_min and Offset_max may be determined by the BS and forwarded to the receiving MS (e.g., forwarded to the TPSS via the FPSS in MS forwarding case). Initial values may be transmitted during initial MS-to-MS association. Alternatively, the receiving MS (e.g., TPSS) may be allowed to vary the offset parameter(s) in a configured range (e.g., given by a maximum of +/−Offset_change_range) from the last value used in a given time. In that case the given time may be pre-defined or signaled by the BS. Alternatively, the offset parameter(s) may be re-defined as the sum of a BS determined part and an MS determined part as in equation (6). Alternatively, the receiving MS (e.g., TPSS) may generate an unconstrained offset parameter(s) and transmit it to the transmitting MS (e.g., FPSS). The offset values may then be clipped to the minimum or maximum at the transmitting MS.

Embodiments for the case where the XL transmissions occur in the UL zone only and not all mobile stations involved in the direct communication on the XL are attached to the BS are disclosed. It is assumed that one MS is associated with the BS while the other is not. Unlike the embodiments above where both mobile stations are attached to the BS, which was symmetric, in the embodiments below the two mobile stations in direct communication on the XL are in different positions relative to the BS.

In this case, the MS not attached to the BS may transmit and receive to and from the peer MS, but may not transmit and receive to and from the BS. The MS not attached to the BS may receive its power control commands through the peer MS attached to the BS. The MS attached to the BS transmits and receives to and from the BS as normal on the TRL. The MS attached to the BS may be power-controlled by the peer MS, or by the BS, or both. In this case, the power control is no longer symmetric as the interference mechanisms are different. The embodiments below are applicable to both MS forwarding and MS-to-MS direct communications.

When the transmitting MS that is attached to the BS (e.g., an FPSS) transmits on the TRL, the embodiments disclosed above for TRL UL transmissions when both mobile stations are attached may be implemented.

When the transmitting MS that is attached to the BS (e.g., an FPSS) transmit on the XL, the transmitting MS may calculate a path loss on the XL to calculate the transmit power level for the transmission. The receiving MS (e.g., a TPSS) on the XL may be instructed to transmit a suitable waveform (e.g., a preamble) that may be identifiable to the receiving MS. The transmitting MS may be notified by the BS of the transmit power of the preamble. Alternatively, it may be notified by the receiving MS. The transmitting MS measures the received preamble power level and calculates the path loss.

For implementation in the 802.16.1-based systems, for control channels that the transmitting MS sends on the XL, the transmitting MS may adjust its power for control channels according to equation (7). The $SINR_{Target}$ in equation (7) may be determined based on the type of the channel. For data packets (including MAC frames) that the transmitting MS sends on the XL, the transmitting MS may adjust its power according to equations (7) through (12).

For implementation in the 802.16-2009-based systems, either equations (4) or (5) above may be used with parameters sent by the BS.

When the transmitting MS that is not attached to the BS (e.g., a TPSS) transmits on the XL, the TPSS may be an "interfering TPSS" or a "non-interfering TPSS." A TPSS is a non-interfering TPSS if the TPSS could interfere with the XL transmissions to other MS and not to the TRL transmissions at the BS. While the TPSS could also interfere with the TRL transmissions at the BS, when the TPSS is out of range of the BS, it may be assumed that the TPSS transmission on the XL may not interfere with the TRL transmissions at the BS. If another BS is in a range, the TPSS may associate with it and therefore it may be assumed that no significant interference is caused by the TPSS transmissions on the XL. The above assumption may not apply if the TPSS MS is not allowed to associate with the other BS (e.g., femto cell operating in a closed service group mode). In this case, a significant interference could be created. A TPSS in this case is called an interfering TPSS. Regardless of the interference caused by the TPSS to the TRL, the TPSS may interfere with other XL. The FPSS also creates interferences both on the TRL and the XL.

For control channels for both interfering and non-interfering TPSS cases, equation (7) may be used. The $SINR_{Target}$ in equation (7) may be determined based on the type of the channel.

For data channels in the interfering TPSS case, equations (7) through (12) may be used. The parameters $\gamma_{IoT}$ and $\delta_{XL}$ in equation (8) together control the tradeoff between own signal SINR and interference to other BS or other MS (on XL), respectively. The parameters $\gamma_{IoT}$ and $\delta_{XL}$ may be signaled by the BS and forwarded to the TPSS, or may be broadcast.

For data channels in the non-interfering TPSS case, the following equation may be used:

$$SINR_{Target} = 10\log_{10}(\max(10^{SINRMIN(dB)/10}, \delta_{XL} SIR_{XL} - \alpha)) - \beta \times 10\log_{10}(TNS). \quad \text{Equation (13)}$$

Embodiments for the case where XL transmissions occur in the UL and DL zones are disclosed hereafter. One MS of the direct communication on the XL may be attached to a BS and the attached MS may transmit in the DL zone. Alternatively, both MS may be attached to the BS and one of them transmits in the DL. Without loss of generality, hereafter, the MS that transmits in the DL zone will be referred to as an FPSS, and the other will be referred to as a TPSS.

Figure 5A:
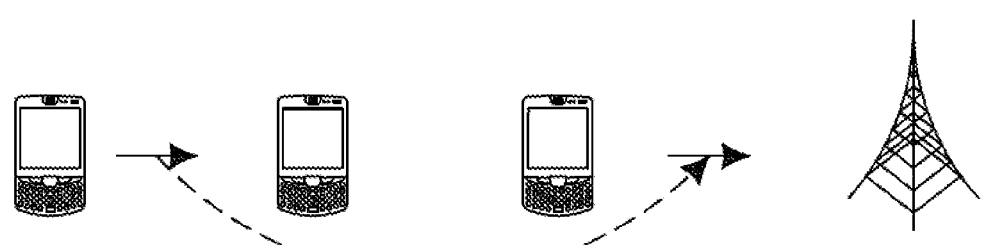
FIG. 5A is a system diagram which illustrates an example interference mechanism in a case where XL transmissions occur in the UL zone.
Figure 5B:
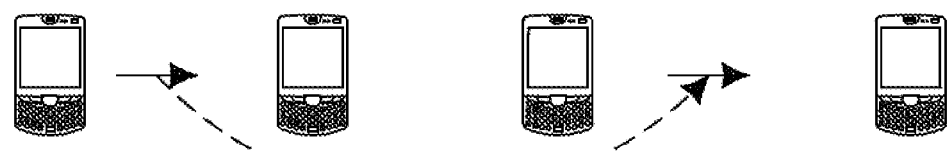
FIG. 5B is a system diagram which illustrates an example interference mechanism in a case where XL transmissions occur in the UL zone.
Figure 5C:
FIG. 5C is a system diagram which illustrates an example interference mechanism in a case where XL transmissions occur in the UL zone.
Figure 5D:
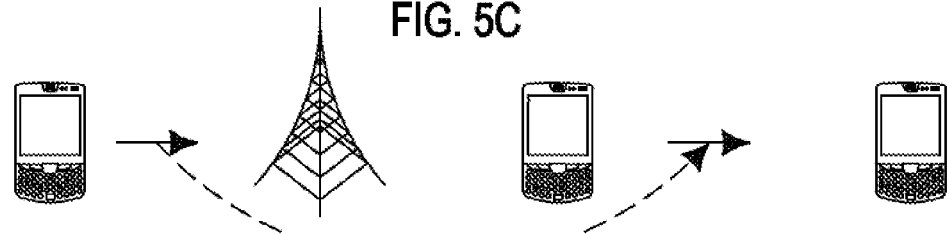
FIG. 5D is a system diagram which illustrates an example interference mechanism in a case where XL transmissions occur in the UL zone.
Figure 5E:
FIG. 5E is a system diagram which illustrates an example interference mechanism in a case where XL transmissions occur in the downlink (DL) zone.
Figure 5F:
FIG. 5F is a system diagram which illustrates an example interference mechanism in a case where XL transmissions occur in the DL zone.

FIGS. 5(A)-5(F) show example interference mechanisms in case where XL transmissions occur in the UL and DL zones. In FIGS. 5(A)-5(F), the sold line represents TRL or XL transmissions, and the dashed line represents interference caused by the TRL or XL transmissions. The XL transmission in the UL zone may cause interference to the TRL UL transmissions and XL transmissions in the UL zone as shown in FIGS. 5(A) and 5(B). The TRL UL transmission may cause interference to another TRL UL transmissions and XL transmissions in the UL zone as shown in FIGS. 5(C) and 5(D). The XL transmission in the DL zone may cause interference to the TRL DL transmissions and XL transmissions in the DL zone as shown in FIGS. 5(E) and 5(F). It should be noted that not all interfering pairs are depicted for simplicity.

When a TPSS transmits to an FPSS on an XL in the UL zone (FIGS. 5(A) and 5(B)), the embodiments disclosed above for the XL transmissions in the UL zone may be applied. When an MS transmits to the BS (FIGS. 5(C) and 5(D)), the embodiments disclosed above for the TRL UL transmissions may be applied.

When an MS (e.g., an FPSS) transmits to an MS (e.g., a TPSS) on an XL in the DL zone (FIGS. 5(E) and 5(F)), the embodiments disclosed above for the XL transmissions in the UL zone may be applied with the difference of the location (DL or UL) of measurements of interference and SIR (as used in 802.16.1 power control). It is also applicable to the case where the XL transmissions occur in the DL zone only.

If XL transmissions take place in a separate channel from the channel for the TRL transmissions, the interference may be attenuated. The channel may be adjacent or not. An adjacent channel is a channel that is close enough so that transmissions on it may create interference to adjacent other channel and can also be interfered by transmissions on the other adjacent channel. Embodiments disclosed above may also be implemented in the adjacent channel case. In order to implement the embodiments disclosed above in this case, the XL transmissions may be handled by the same network, and that network may have access to XL as well as TRL parameters. The networks may not use the same transmission waveforms (e.g., one may be CDMA and the other may be OFDMA). An example is the TDD transmission adjacent to UL component of FDD, (e.g., XL in 1900-1920 MHz which is adjacent to the UL part of HSPA). This case is equivalent to XL in the UL zone except for the attenuated interference.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit receive unit (WTRU) comprising:
   circuitry configured to receive, from a base station associated with WTRU to WTRU direct communication, power control configuration information for use in WTRU to WTRU direct communication; wherein the power control configuration information includes power control configuration information for an uplink channel from the WTRU to the base station and for a data channel for WTRU to WTRU direct communication and for a control channel for WTRU to WTRU direct communication;
   the circuitry further configured to receive time and frequency resource information for WTRU to WTRU direct communication;
   the circuitry further configured to transmit over the uplink channel to the base station at a power level based on a pathloss value added to a first value received in the power control configuration information;
   the circuitry further configured to transmit over the data channel, based on the time and frequency resource information, selectively using a power level based on a pathloss value added to a second value received in the power control configuration information or using a power level not based on the pathloss; and
   the circuitry further configured to transmit over the control channel based on the power control configuration information for the control channel.

2. The WTRU of claim 1 wherein the circuitry is further configured to receive a transmit power control command from the base station for use in setting the transmission power level of the data channel.

3. The WTRU of claim 1 wherein the base station is a cellular base station.

4. The WTRU of claim 3 wherein the cellular base station is an LTE or LTE-A base station.

5. A method for use in a wireless transmit receive unit (WTRU), the method comprising:
 receiving, from a base station associated with WTRU to WTRU direct communication, power control configuration information for use in WTRU to WTRU direct communication; wherein the power control configuration information includes power control configuration information for an uplink channel from the WTRU to the base station and for a data channel for WTRU to WTRU direct communication and for a control channel for WTRU to WTRU direct communication;
 receiving time and frequency resource information for WTRU to WTRU direct communication;
 transmitting over the uplink channel to the base station at a power level based on a pathloss value added to a first value received in the power control configuration information;
 transmitting over the data channel, based on the received time and frequency resource information, selectively using a power level based on a pathloss value added to a second value received in the power control configuration information or using a power level not based on the pathloss; and
 transmitting over the control channel based on the power control configuration information for the control channel.

6. The method of claim 5, further comprising receiving a transmit power control command from the base station for use in setting the transmission power level of the data channel.

7. The method of claim 5, wherein the base station is a cellular base station.

8. The method of claim 5, wherein the cellular base station is an LTE or LTE-A base station.

9. A base station comprising:
 circuitry configured to transmit, to a wireless transmit receive unit (WTRU) associated with WTRU to WTRU direct communication, power control configuration information for use in WTRU to WTRU direct communication; wherein the power control configuration information includes power control configuration information for an uplink channel from the WTRU to the base station and for a data channel for WTRU to WTRU direct communication and for a control channel for WTRU to WTRU direct communication;
 the circuitry further configured to transmit time and frequency resource information for WTRU to WTRU direct communication;
 the circuitry further configured to receive over the uplink channel from the WTRU at a power level based on a pathloss value added to a first value transmitted in the power control configuration information.

10. The base station of claim 9 wherein the circuitry is further configured to transmit a transmit power control command to the WTRU for use in setting the transmission power level of the data channel.

11. The base station of claim 9 wherein the base station is a cellular base station.

12. The base station of claim 9 wherein the base station is an LTE or LTE-A base station.

13. A wireless transmit receive unit (WTRU) comprising:
 circuitry configured to receive, from a base station, power control configuration information for use in WTRU to WTRU direct communication; wherein the power control configuration information includes power control configuration information for an uplink channel from the WTRU to the base station and for a data channel for WTRU to WTRU direct communication and for a control channel for WTRU to WTRU direct communication;
 the circuitry further configured to transmit over the uplink channel to the base station at a power level based on a pathloss value added to a first value received in the power control configuration information;
 the circuitry further configured to transmit over the data channel, selectively using a power level based on a pathloss value added to a second value received in the power control configuration information or using a power level not based on the pathloss; and
 the circuitry further configured to transmit over the control channel based on the power control configuration information for the control channel.

14. The WTRU of claim 13 wherein the circuitry is further configured to receive a transmit power control command from the base station for use in setting the transmission power level of the data channel.

15. The WTRU of claim 13 wherein the base station is a cellular base station.

16. The WTRU of claim 15 wherein the cellular base station is an LTE or LTE-A base station.

17. The WTRU of claim 13, further comprising circuitry configured to receive time and frequency resource information for WTRU to WTRU direct communication.

18. The WTRU of claim 13 further comprising circuitry configured to transmit over the data channel based on time and frequency resource information.

* * * * *